United States Patent [19]

Beaver et al.

[11] Patent Number: 4,627,940

[45] Date of Patent: Dec. 9, 1986

[54] PROCESS FOR PREPARING A POLYAMIDE

[75] Inventors: Earl R. Beaver; J. Harvey Lester, Jr.; Thomas J. Thompson, all of Pensacola, Fla.

[73] Assignee: Monsanto Company, St. Louis, Mo.

[21] Appl. No.: 427,088

[22] Filed: Sep. 29, 1982

[51] Int. Cl.$^4$ .................... C07C 102/04; C08G 69/26
[52] U.S. Cl. ........................... 260/501.11; 260/501.2; 528/335
[58] Field of Search .................. 260/501.11, 501.2; 528/335

[56] References Cited

U.S. PATENT DOCUMENTS

| 2,130,947 | 9/1938 | Carothers | 260/501.2 |
| 3,407,179 | 10/1968 | Carr | 528/335 |
| 4,233,234 | 1/1980 | Rotzoll et al. | 528/335 |

FOREIGN PATENT DOCUMENTS 1124507  3/1962  Fed. Rep. of Germany ... 260/501.2

Primary Examiner—Glennon H. Hollrah
Assistant Examiner—Raymond Covington
Attorney, Agent, or Firm—Thomas N. Wallin

[57] ABSTRACT

A dicarboxylic acid is separated from the product stream in the form of wet crystals, shipped to a different location in a shipping container, and unloaded from the shipping container by dissolving the dicarboxylic acid in salt solution.

4 Claims, 5 Drawing Figures

PROCESS FOR PREPARING A POLYAMIDE

BACKGROUND OF THE INVENTION

Field of the Invention

The invention relates to the preparation of polyamides from aqueous solutions of polyamide-forming reactants, where the preparation of the polyamide takes place at a location other than the location of the preparation of the polyamide-forming reactants.

In the formation of polyamides, and particularly those that are useful in production of films and/or fibers, a high molecular weight polymer is normally obtained by polycondensation of low molecular weight polymer that has been prepared from an aqueous solution of polyamide-forming reactants. The low molecular weight polymer is typically produced by a process in which the aqueous solution is first concentrated by evaporating water from the solution and the concentrated solution is then heated to a temperature sufficient to form low molecular weight polymer from the reactants.

In general, the aqueous solution of polyamide-forming reactants includes at least one organic dicarboxylic acid which preferably contains from four to twelve carbon atoms, for example an alkylene or aromatic dicarboxylic acid such as adipic, succinic, sebacic, terephthalic, isophthalic or naphthalic acid, and at least one organic diamine which preferably contains from four to twelve carbon atoms, for example an alkylene or aromatic diamine such as hexamethylene, tetramethylene, pentamethylene, heptamethylene, decamethylene, phenylene or naphthalene diamine. In the preparation of film and/or fiber-forming polyamides, these reactants are generally combined in proportions that are approximately stoichiometrically equivalent and dissolved in water to form a solution containing from about 25% to about 55% and preferably from 40% to 50% by weight of the reactants. Further treatment of such solutions, for example, by pH adjustment, inclusion of additives or purification, e.g., by an absorbent such as activated carbon, may be carried out before polymerization, if desired, to improve the properties of the ultimate polymeric product.

Most desirably, the aqueous solution of polyamide-forming reactants is first heated to evaporate water and thereby concentrate the solution to at least about 60% by weight of the reactants, for example at a temperature between about 105° and about 300° C., and a pressure between about one atmosphere and about 100 pounds per square inch gauge.

Typical of the dicarboxylic acids used in the preparation of polyamides is adipic acid. A well known commercial method of producing adipic acid, a valuable and widely used chemical, involves a series of steps including:

(1) the oxidation of cyclohexane in a liquid phase with air or other molecular oxygen-containing gas to a mixture of cyclohexanol and cyclohexanone at rather low conversion but with high yields;

(2) the separation of the unoxidized cyclohexane from the mixed cyclohexanol and cyclohexanone intermediate reaction product;

(3) the final oxidation of the intermediate product with a strong oxidizing acid, such as nitric acid, into adipic acid and concomitant minor amounts of other dibasic organic acids, including glutaric acid and succinic acid; and (4) the isolation of the adipic acid from these by-product organic acids, such as by crystallization.

When the adipic acid is separated from the product stream the adipic acid crystals are ordinarily wet from a water wash.

Commercially, it has been a common practice, wherever the preparation of the polyamide forming reactants is at a location other than the location of the formation of the nylon polymer, to dry and then ship the adipic acid. Since the polyamide-forming reactants are ordinarily dissolved in water and reacted therein to form a salt solution, it would be much more desirable to ship the adipic acid wet thereby to eliminate the drying step, such an improvement being an object of this invention. As used herein the term "wet" means water and/or solvent laden.

SUMMARY OF THE INVENTION

The invention is an improvement in the process for the production of polyamide salt from a dicarboxylic acid where the dicarboxylic acid is separated from its product stream in the form of wet crystals, and where the wet dicarboxylic acid crystals, prior to shipment, are dried, loaded into a shipping container at one location, shipped to another location and thereafter unloaded and mixed with sufficient amounts of water and/or diamine to form a nylon salt solution of about 30%–60% by weight. The improvement comprises loading the wet dicarboxylic acid into the shipping container without prior drying; and unloading the dicarboxylic acid from the shipping container to a second container by feeding an aqueous solution of nylon salt into the shipping container thereby entraining the wet dicarboxylic acid and concomitantly providing a solution of the nylon salt and unreacted dicarboxylic acid, draining the salt-dicarboxylic acid solution from the shipping container, adding hexamethylene diamine to the drained salt-dicarboxylic acid solution in an amount to react with the unreacted adipic, and continuously circulating the resulting salt solution to the shipping container with subsequent further addition of hexamethylene diamine at an approximate mole ratio to the dicarboxylic acid of 1:1 so as to dissolve and remove most of the adipic acid from the shipping container. Where the dicarboxylic acid is adipic and the diamine is hexamethylene diamine, the preferred acid solution is 30–50% and the preferred salt solution is 40–60%.

In the detailed description, reference will be made to the drawing in which.

DETAILED DESCRIPTION OF THE INVENTION

Although the invention applies to the organic dicarboxylic acids and diamines for convenience, it will be described in terms of the preferred adipic acid and hexamethylene diamine.

Figure 1:
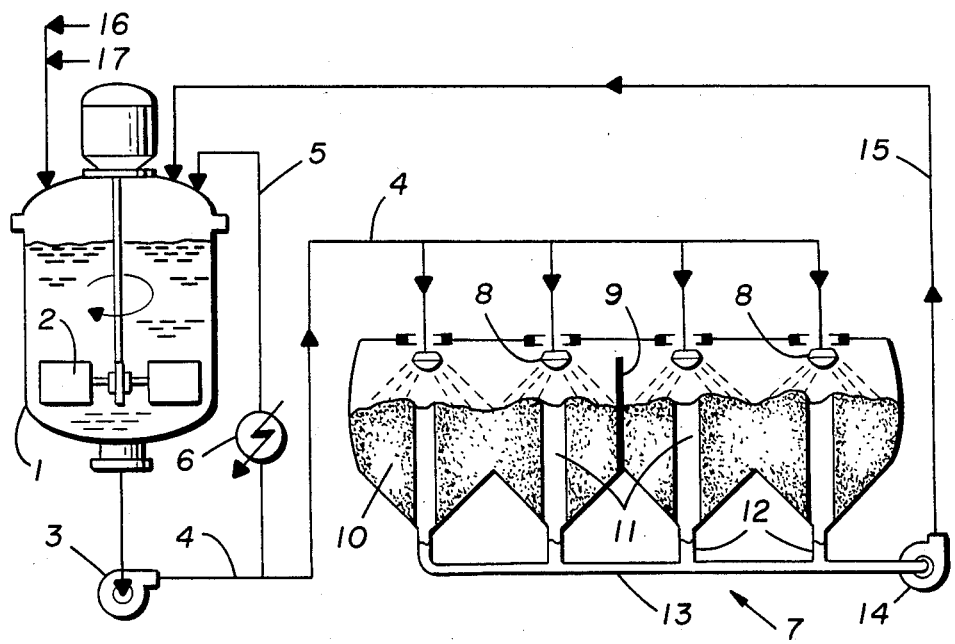
FIG. 1 is a schematic diagram of a preferred embodiment of equipment arrangement for a dicarboxylic acid hopper truck or railcar unloading.

Referring now in detail to FIG. 1, tank 1 has agitator 2, feedlines 5, 15, 16 and 17, and drainline 4. Drainline 4 is connected to recirculating feed line 5 which runs through heat exchanger 6. It is also connected to hopper truck 7 by line 4 which in turn feeds spray nozzles 8 through adipic shafts 11 and drains 12 to exit line 13, through pump 14 and return feed line 15.

Figures 2, 3:
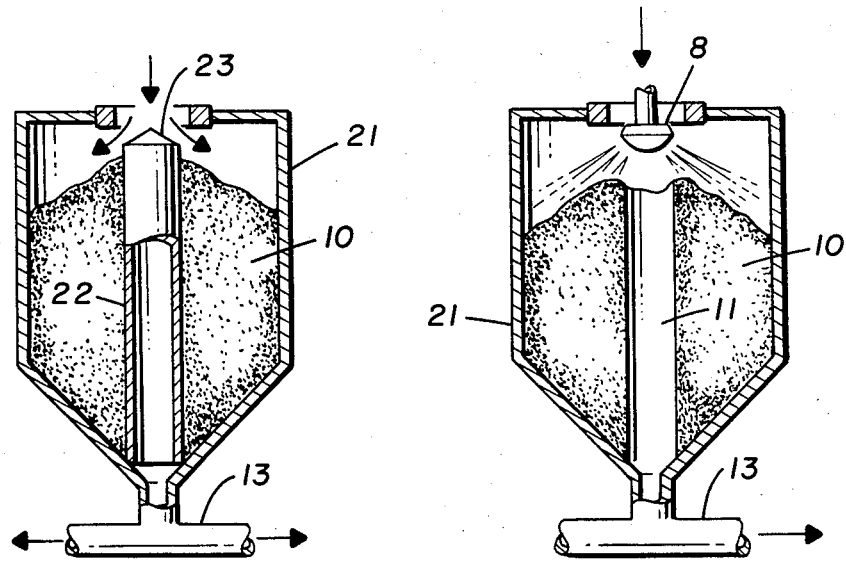
FIGS. 2–5 are schematic cross-sections of a hopper showing various stages of loading and unloading of the dicarboxylic acid.

Referring now in detail to FIGS. 2-5, hopper 21 has affixed therein spacer 22 having a cap 23 in juxtaposition with drain 13. Wet adipic is loaded around spacer 22 as shown in FIG. 2.

In FIG. 3, spacer 22 has been removed thereby creating channel 11 having walls comprising coagulated adipic. A spray nozzle 8 has been inserted at the top of the hopper so as to shower salt solution on the surface of the adipic and particularly through and along the walls of channel 11. Adipic solution is removed from the hopper through drain 13.

Figure 4:
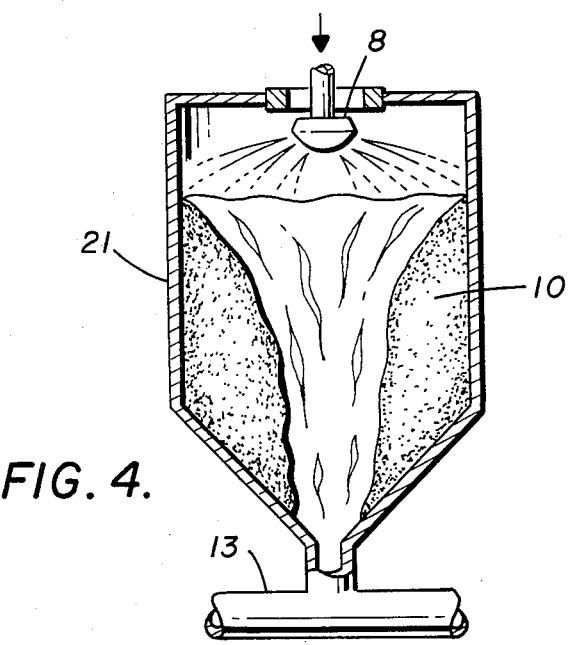

In FIG. 4, an increased amount of adipic has been removed.

Figure 5:
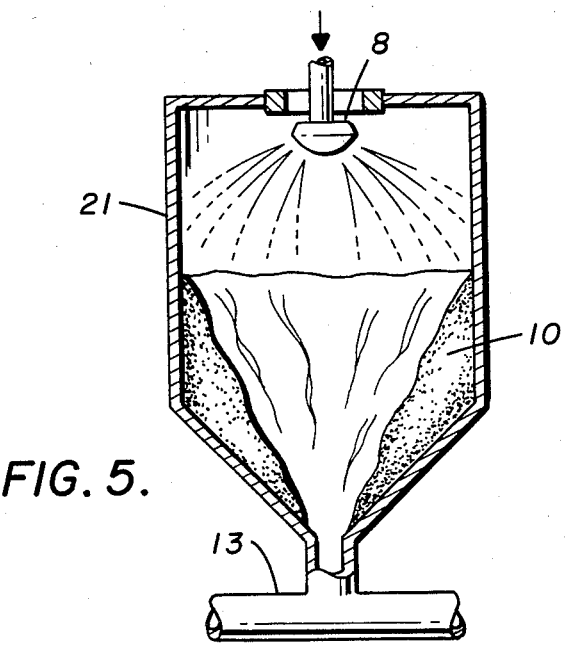

In FIG. 5, nearly all of the remaining adipic has been removed.

In operation, according to the preferred embodiment, an elongated spacer 22 in the form of a hollow pipe is inserted into the hopper in juxtaposition with drain 13, as shown in FIG. 2, with a cap thereupon. Wet adipic acid is loaded into the hopper generally around spacer 22. Before the adipic acid is unloaded spacer 22 is removed generally vertically leaving a channel in the adipic shown on the drawing as channel 11. On arrival at the new location, and refering back to FIG. 1, tank 1, fed by water and hexamethylene diamine feed lines 16 and 17, contains a nylon 66 aqueous salt solution which is fed to the hoppers through line 4. Spray nozzles 8 are opened thereby showering aqueous salt solution on and through the adipic acid. As the salt solution impinges upon the adipic, adipic acid is dissolved and the salt solution of adipic acid is drained through line 13, pump 14, and return line 15 back into tank 1. This is continued with hexamethylene diamine feed as required to form a nylon salt solution in tank 1 of about 40-60% by weight.

EXAMPLE

A hopper car was loaded with about 28,000 pounds of adipic acid with 8.5 wt % water. The center drain cavaties were formed as described above.

The solvent was 51 wt % nylon 66 aqueous salt solution at 65° C. Tank 1 (FIG. 1) was initially charged with 1,800 gallons of this salt solution containing a 0.29 wt % excess of adipic acid. A stream of 32 wt % hexamethylene diamine in water was fed to the tank as shown in FIG. I to maintain the initial pH of 7.0 and the neutralized salt concentration at about 51 wt %. Cooling water was circulated through heat exchanger 6 to remove the heat of salt formation from the reacting adipic acid and hexamethylene diamine. The salt solution was circulated through the hoppers at 230 gpm per hopper. The tank solution level increased as the adipic acid dissolved and the water-hexamethylene diamine was added to maintain pH at 7.0. Table I reflects the progress of the adipic acid removal from the first two hoppers until the tank was full.

TABLE I

| Time (min) | Tank Level % | Excess Adipic in Tank Wt % | Excess Adipic in Hopper Discharge (wt %) | Calculated** Dry Adipic Removed from Truck (lbs) |
|---|---|---|---|---|
| 0 | 25 | 0.29 | — | 0 |
| 5 | 31 | 0.44 | 15.6 | 3,100 |
| 10 | 46 | 10.10 | 23.5 | 5,900 |
| 15 | 65 | 0.87 | 21.11 | 10,100 |
| 25* | 98 | 4.99 | 11.66 | 12,900 |
| 35 | 98 | 0.49 | 4.00 | 14,300 |
| 45 | 85 | 0.52 | 2.08 | 15,000 |

*Solution removed from tank to prevent overflow.
**Calculated from circulation rate and adipic acid concentration differences.

The remaining two hoppers were unloaded in a similar manner but the tank salt level was maintained constant at 60% by removing the salt solution as required.

The salt temperature was controlled at 60° C., the pH at 6.5, and the circulation rate was 150 gpm per hopper resulting in a reduced solution rate that averaged 10,300 lbs/hr for the first 35 minutes. Table II shows the hopper's inlet and outlet excess adipic acid concentration versus time for this test.

TABLE II

| Time (min) | Excess Adipic Acid (wt %) | | Calculated Dry Tank Neutralized Salt Concentration wt % | Adipic Removed from Truck (lbs) |
|---|---|---|---|---|
| | Hopper Inlet | Hopper Outlet | | |
| 0 | 0.89 | — | 50.96 | 0 |
| 5 | 2.94 | 11.01 | 51.07 | 1,140 |
| 15 | 0.92 | 10.16 | 50.70 | 3,760 |
| 25 | 0.96 | 6.19 | 50.96 | 5,240 |
| 35 | 0.95 | 3.72 | 51.17 | 6,010 |
| 50 | 1.45 | 6.60 | 51.22 | 8,200 |
| 70 | 1.14 | 5.39 | 51.58 | 10,500 |
| 170 | 1.18 | 1.18 | 52.21 | 10,600 |

We claim:

1. In a process for the production of nylon salt from a dicarboxylic acid where the dicarboxylic acid is separated from the product stream in the form of wet crystals and where the dicarboxylic acid crystals, prior to shipment, are dried, loaded into a shipping container at one location, shipped to another location, and thereafter unloaded, mixed with sufficient amounts of water to form an aqueous dicarboxylic acid solution and then with aqueous diamine to form a nylon salt solution, the improvement comprising loading the wet dicarboxylic acid into the shipping container without prior drying; and unloading the dicarboxylic acid from the shipping container to a second container by feeding an aqueous solution of nylon salt into the shipping container, thereby entraining the wet dicarboxylic acid and concomitantly providing a solution of nylon salt and unreacted dicarboxylic acid, draining the salt-dicarboxylic solution from the shipping container, adding diamine to the drained salt-dicarboxylic solution in an amount to react with the unreacted dicarboxylic acid and continuously recirculating the resulting salt solution to the shipping container with subsequent further addition of diamine so as to dissolve and remove most of the dicarboxylic acid from the shipping container.

2. The process improvement of claim 1 wherein the dicarboxylic acid is adipic acid.

3. The process improvement of claim 2 wherein the diamine is hexamethylenediamine.

4. The process improvement of claim 3 wherein the diamine is hexamethylene diamine and the concentration of the resulting polyamide salt solution is 40-60% by weight.

* * * * *